STATIC TIMING MEANS FOR PRODUCING AN OUTPUT CONTROL SIGNAL IF AN INPUT SIGNAL PERSISTS FOR A PREDETERMINED MINIMUM TIME INTERVAL

Filed Nov. 4, 1963

INVENTOR:
LEONARD SCHARF,
BY Albert S. Richardson Jr.
ATTORNEY

United States Patent Office 3,317,745

Patented May 2, 1967

3,317,745

STATIC TIMING MEANS FOR PRODUCING AN OUTPUT CONTROL SIGNAL IF AN INPUT SIGNAL PERSISTS FOR A PREDETERMINED MINIMUM TIME INTERVAL

Leonard Scharf, Broomall, Pa., assignor to General Electric Company, a corporation of New York Filed Nov. 4, 1963, Ser. No. 321,072

6 Claims. (Cl. 307—88.5)

This invention relates to static timing circuits, and more particularly it relates to electric circuits employing solid state components, without moving parts, for performing predetermined time delay functions.

One objective of my invention is the provision of an improved static timing circuit having time delay pickup and instantaneous dropout characteristics. By time delay pickup I mean that the circuit "turns on" (it becomes operative to produce a useful output signal) only when an input signal has been continuously applied to it for a predetermined length of time, and by instantaneous dropout I mean that the circuit "turns off" (stops producing the output signal) in substantially instantaneous response to the input being subsequently suspended.

It is yet another object of my invention to provide an improved static timing circuit characterized by time delay pickup and time delay dropout. By time delay dropout I mean that the circuit sustains its output signal for a predetermined interval of time after the input signal is removed.

The time delay pickup and instantaneous dropout circuit that is claimed hereinafter has previously been shown and described in a copending U.S. Patent 3,273,017—Mathews (filed Jan. 7, 1963, and granted Sept. 13, 1966), and a specific object of my invention is to provide a timing circuit well suited for use in the protective relaying system that is the subject matter of that patent.

In carrying out my invention in one form, a time delay pickup and instantaneous dropout circuit is obtained by providing, in combination, first and second normally inactive condition responsive means, level detecting means, and normally discharging electric energy storing means. The two condition responsive means are interconnected and arranged so that whenever both are concurrently active an output control signal of predetermined characteristics is produced. Activation of the first condition responsive means is initiated by the level detecting means in response to the energy storing means accumulating a predetermined critical level of electric energy, and feedback means is provided to ensure that the first means remains active so long as the aforesaid output control signal is being produced. The energy level of the energy storing means, which means begins accumulating energy on being energized by a predetermined input signal, will attain said critical level when the input signal has been applied continuously for a predetermined length of time. I arrange the second condition responsive means for activation in direct response to the application of the aforesaid input signal, and therefore said output signal, once produced, is sustained only while the input signal persists. In another aspect of the invention, the above-summarized circuit is modified to obtain a time delay dropout function by providing means for delaying deactivation of the second condition responsive means for a predetermined time interval after the input signal is removed.

My invention will be better understood and its various objects and advantages will be more fully appreciated from the following description taken in conjunction with the accompanying drawing in which.

Figure 1:
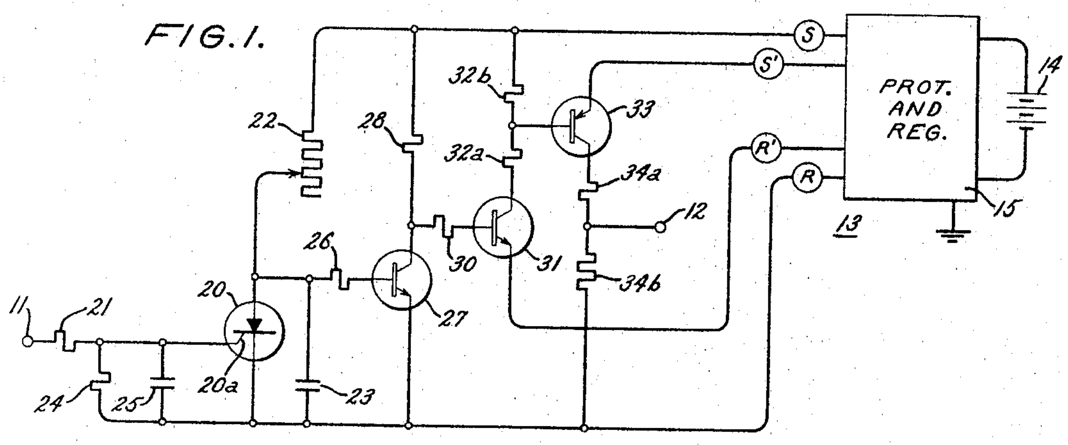
FIG. 1 is a schematic circuit diagram of an instantaneous pickup, time delay dropout circuit.

Referring now to FIG. 1, the static timing circuit illustrated therein is provided with an input terminal 11, an output terminal 12, and a source 13 of regulated control power. The control power source comprises, for example, a battery 14 having connected thereto suitable protection and regulating means 15. For convenience, I have used in each figure of the drawing the encircled terminals R and S to represent, respectively, a common reference bus (energized from the negative terminal of the battery 14) and a supply voltage bus which is positive with respect to the reference bus. The magnitude of the supply voltage is preferably about 20 volts. For convenience I also derive from this source two other buses which are energized by bias potentials: the negative bias bus, represented by the encircled terminal R′, has a level of potential slightly more positive than the reference bus R; and the positive bias bus, represented by the encircle S′, has a level of potentials slightly less positive than the supply voltage bus S.

The intended function of the timing circuit shown in FIG. 1 is to develop a sustained output signal at terminal 12 in substantially instantaneous response to energization of the input terminal 11 by a signal or voltage pulse of positive polarity with respect to the reference bus R. This pulse stretching circuit is designated reliably to sustain its output signal continuously for a predetermined minimum interval of time, such as 9 milliseconds, even if its input signal should persist for only a brief moment. By utilizing such a circuit in a protective relaying systems of copending patents 3,277,343—Seeley and 3,277,344—Mathews (both filed Feb. 6, 1923, and granted Oct. 4, 1966), an intermittent signal (recurring at less than 9-millisecond intervals, for example) can be converted to a continuous signal useful for control purposes.

As can be seen in FIG. 1, the circuit comprises a solid state controlled rectifier 20 whose gate electrode 20a is connected by way of a current limiting resistor 21 to the input terminal 11 for energization by the input signal when applied thereto. The cathode of the controlled rectifier 20 is connected directly to the reference bus R, and its anode is connected to the junction of a rheostat 22 and a capacitor 23 which are interconnected in series to form energy storing means connected across the supply voltage bus S and the reference bus R as shown. The controlled rectifier 20 is normally inactive or "open," and the capacitor 23 is normally charged. A parallel combination of a resistor 24 and a surge suppressing capacitor 25 of relatively small capacitance is connected between the cathode and gate electrode of the controlled rectifier 20 to prevent activation of this device by stray voltage transients or spurious surges.

Until triggered or activated by a small "gate current" in its gate electrode 20a, the controlled rectifier 20 blocks current flow and hence it is in effect an open circuit. When so triggered, however, it will abruptly switch to a low-forward-impedance state in which its anode-cathode circuit can readily conduct load current. So long as the anode current then exceeds a predetermined minimum value (the "holding current") required to sustain conduction in a controlled rectifier of the type illustrated, this device remains active even after the gate signal is removed.

Whenever the input terminal 11 is momentarily energized by a relatively positive signal of sufficient magnitude, gate current of appropriate magnitude and duration for triggering the controlled rectifier 20 is supplied to this device. The controlled rectifier 20 immediately "closes," and any energy stored in the capacitor 23 is quickly dissipated. The capacitor discharge current rapidly decays to a value less than holding current. The minimum resistance value of element 22 is selected to be so high that the source of supply voltage cannot supply holding current to maintain 20 in an active state. As a result, there is insufficient anode current in the controlled rectifier 20 to sustain conduction after the gate signal is removed, and the controlled rectifier 20 will immediately revert to its open, inactive state whenever the capacitor charge is dissipated and the input terminal 11 is de-energized. The capacitor 23 then responds by again accumulating energy from the supply voltage source, with the time constant of this recharging operation being determined by the adjustment of the rheostat 22.

The voltage level across capacitor 23 is utilized to control level detecting means which comprises the succeeding portions of the circuit shown in FIG. 1. Connected to the junction of rheostat 22 and capacitor 23, by way of a current limiting resistor 26, is the base electrode of an NPN transistor 27 whose emitter is connected directly to the reference bus R and whose collector is connected through a load resistor 28 to the supply voltage bus S. The collector of transistor 27 is also connected thorugh a current limiting resistor 30 to the base electrode of a normally inactive NPN transistor 31. The emitter of the latter transistor is connected directly to the negative bias bus R′, while its collector is connected to the supply voltage bus S by way of a load impedance comprising a pair of resistors 32*a* and 32*b* in series. Actuation of the transistor 31 will permit effective energization of the load impedance 32*a*, 32*b* by the supply voltage.

So long as the capacitor 23 is in its normally charged condition, its voltage exceeds a magnitude that reflects forward bias of the emitter-base junction of transistor 27, and this transistor is in a conductive (active) state. As a result, the emitter-base junction of the companion transistor 31 is reverse biased, and this transistor is "off." The capacitor 23, however, will become discharged whenever the controlled rectifier 20 is activated in response to an energizing signal being applied to the terminal 11, and under these circumstances forward bias current in the emitter-base junction of transistor 27 can no longer be sustained, whereby this transistor is inactive or turned off. The transistor 27 will remain off while the capacitor 23 remains discharged and for a predetermined additional interval of time commencing as soon as the capacitor begins to recharge in response to deactivation of the controlled rectifier 20. This predetermined time interval expires when the voltage across the recharging capacitor 23 attains a critical threshold level required to effect forward current flow in the emitter-base junction of transistor 27, whereupon this transistor is again turned on. The time delay thus obtained is dependent upon the time constant of the charging circuit of capacitor 23, and as one practical example a 9-millisecond delay has been realized by adjusting the rheostat 22 so that the time constant is about 0.2 second.

Throughout the period that the transistor 27 is off, the companion transistor 31 is on. As can be seen in FIG. 1, the junction of the resistors 32*a* and 32*b* in the load circuit of transistor 31 is connected to the base electrode of a normally inactive PNP transistor 33 whose emitter is connected to the positive bias bus S′ and whose collector is connected through two voltage dividing resistors 34*a* and 34*b* to the reference bus R, resistor 34*b* having a much greater resistance value than 34*a*. Whenever transistor 31 is on, a portion of its collector current will follow a path through the emitter-base junction of transistor 33, thereby forward biasing the same, and the latter transistor is turned on and off simultaneously with the former. The output terminal 12 of the illustrated circuit is connected to the junction of resistors 34*a* and 34*b*, and it will be substantially the same level of potential as the reference bus R (a null output) while the transistor 33 is off. But whenever transistor 33 is turned on, as it is throughout the periods of inactivation of transistor 27, there is developed across resistor 34*b* a D.-C. voltage of substantially constant magnitude nearly equal to the magnitude of the supply voltage, and this voltage, taken from terminal 12, comprises the output signal of the timing circuit shown in FIG. 1.

It will be apparent from the foregoing description of FIG. 1 that the illustrated circuit operates to produce an output signal at terminal 12 in substantially instantaneous response to the application of a predetermined signal to its input terminal 11 and to sustain this output signal for a predetermined time interval following the termination of the input signal. The predetermined time interval is dependent upon the time constant of the charging circuit for capacitor 23. It will be observed that should an input signal recur at any time during this interval, the controlled rectifier 20 is then triggered and the capacitor 23 is again discharged completely, whereby the timing of the predetermined interval starts anew. Reliable timing is assured because the delay interval always commences with the capacitor in a completely discharged state.

Figure 2:
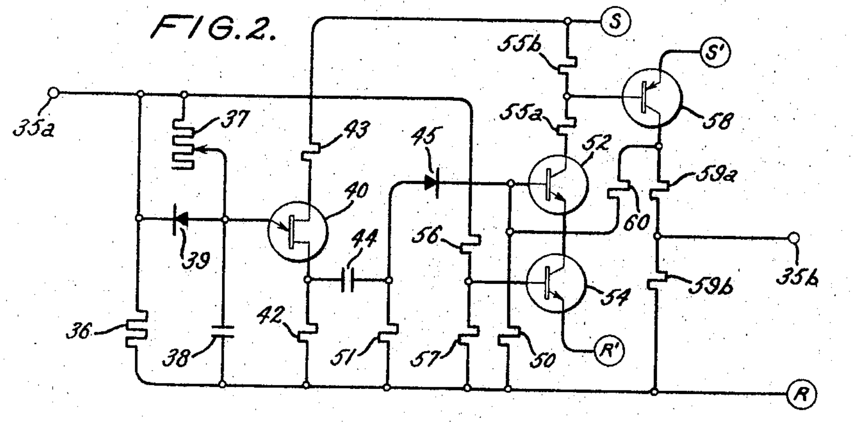
FIG. 2 is a schematic circuit diagram of a preferred embodiment of the time delay pickup, instantaneous dropout form of my invention.

Referring next to FIG. 2, the static timing circuit illustrated therein is seen to include an input terminal 35*a* and an output terminal 35*b*. This circuit is intended to produce an output control signal at terminal 35*b* in delayed response to the energization of its input terminal 35*a* by a signal or voltage of positive polarity with respect to the reference bus R, production of the output signal being subsequently suspended as soon as the input signal is discontinued. The circuit is designed to turn on when it has been continuously energized for a definite interval of time, such as two milliseconds.

As can be seen in FIG. 2, the input terminal 35*a* of the illustrated circuit is connected by means of a resistor 36 to the reference bus R. Energy storing means, comprising a resistor 37 of variable resistance (a rheostat or the like) in series with a capacitor 38, is connected across the resistor 36, with an appropriately poled diode 39 shunting the rheostat 37 in order to provide, in conjunction with the resistor 36, a relatively low-impedance path for capacitor discharge current. The voltage developed across capacitor 38 when energized is utilized to control level detecting means comprising a double-base diode 40 which is known in the art as a unijunction transistor. The emitter of the unijunction transistor 40 is connected to the relatively positive terminal of the capacitor 38. Base-one of the unijunction transistor (the lower base electrode as viewed in FIG. 2) is connected through a resistor 42 to the reference bus R, while base-two is connected through a resistor 43 to the supply voltage bus S. Preferably the resistances of the base resistors 42 and 43 are selected to be equal to each other.

Upon energization of the terminal 35*a* by an input signal of appropriate magnitude, the capacitor 38 will accumulate energy until its voltage attains a critical level that is a predetermined percentage of the supply voltage applied across the base electrodes of the unijunction transistor 40. At this level a characteristic peak point emitter voltage is reached, and the unijunction transistor 40 fires (that is, it abruptly switches from a high impedance to a low impedance state). The time required to reach the critical firing level, measured from the initial moment of energization, is determined by the time constant of the series RC energy storing circuit 37, 38, and the rheostat 37 can be so adjusted that this "pickup" time is equal to approximately two milliseconds. Thus the unijunction transistor operates only in response to an energizing signal of at least 2-millisecond duration, and if the energizing signal should be discontinued or expire at any time before the end of this predetermined delay, the diode 39 enables the capacitor 38 to discharge very quickly, thereby "resetting" the circuit with dispatch.

The parameters of the above-described portion of the circuit shown in FIG. 2 are chosen so that the unijunction transistor 40 operates in a relaxation oscillator mode; upon firing, this transistor produces an intermediate signal pulse at its base-one which is coupled by a capacitor 44 to the remaining part of the circuit. As can be seen in FIG. 2, the coupling capacitor 44, in circuit with an appropriately poled isolating diode 45, is connected between base-one of the unijunction transistor 40 and the base electrode of an NPN transistor 52. A base resistor 50 is connected between the base electrode of transistor 52 and the reference bus R, and the junction of capacitor 44 and diode 45 is tied to the reference bus by another resistor 51. The emitter of the transistor 52 is connected to the collector of an additional NPN transistor 54 with which it is disposed in tandem. The emitter of the transistor 54 is connected in turn to the negative bias bus R′, while the collector of the transistor 52 is connected to the supply voltage bus S through a load impedance comprising a pair of resistors 55*a* and 55*b* in series.

The two transistors 52 and 54 comprise normally inactive condition responsive means. Both must be concurrently active in order to permit effective energization of the load impedance 55*a*, 55*b* by the supply voltage. Activation of transistor 52 is controlled by the above-described level detecting means. Whenever the unijunction transistor 40 fires, it produces a signal pulse that is applied, via the coupling capacitor 44, to the base electrode of transistor 52, and the transistor 52 is forward biased (activated) thereby.

The base electrode of the other transistor 54 is connected by way of a current limiting resistor 56 to the input terminal 35*a* of the illustrated circuit for energization simultaneously with energization of the energy storing means 37, 38. A base resistor 57 is connected between this base electrode and the reference bus, and the emitter-base junction of transistor 54 is normally reversely biased. It is apparent in FIG. 2 that the transistor 54 is forward biased (rendered conductive or active) only when an input signal is applied to terminal 35*a*. However, no significant amount of current can be conducted by the transistor 54 until the companion transistor 52 is also activated, which occurs upon operation of the unijunction transistor 40 two milliseconds after the input signal is initially applied.

Whenever both of the transistors 52 and 54 are concurrently active, their serially interconnected emitter-collector circuits readily conduct load current in their saturated regions, and the junction of resistors 55*a* and 55*b* then becomes appreciably negative with respect to the supply voltage bus S. This junction is connected to a base electrode of a normally inactive PNP transistor 58 whose emitter is connected directly to the positive bias bus S′ and whose collector is connected to the reference bus R through two voltage dividing resistors 59*a* and 59*b*, the latter having a much larger resistance value than the former. A portion of the load current conducted jointly by the transistors 52 and 54 will follow a path through the emitter-base junction of transistor 58, thereby forward biasing the same, and the latter transistor is accordingly turned on. When the transistor 58 is thus activated, there is derived across resistor 59*b* a unipolarity voltage of substantially constant magnitude nearly equal to the magnitude of supply voltage. The output terminal 35*b* is connected to the junction of resistors 59*a* and 59*b*, and the voltage there derived comprises the output signal which the illustrated circuit produces when on.

As is shown in FIG. 2, the transistors 52 and 58 are interconnected with positive feedback so that forward current conduction in the emitter-base junction of the former is augmented upon activation of the latter. This is accomplished by connecting the base electrode of transistor 52 to the collector of transistor 58 through a feedback resistor 60. This positive feedback circuitry contributes to a snap action response by the illustrated circuit upon expiration of its two-millisecond pickup delay, and it prevents deactivation of transistor 52 at the conclusion of the initial activating pulse received from the unijunction transistor 40. It is therefore apparent that the transistor 52, once activated to turn on this timing circuit, can then exercise no further control over its operation, and the output signal at terminal 35*b* is sustained until the transistor 54 is deactivated upon subsequent deenergization of the input terminal 35*a*. The provision of transistor 54 enables the desired instantaneous dropout function of the FIG. 2 circuit to be achieved.

Figure 3:
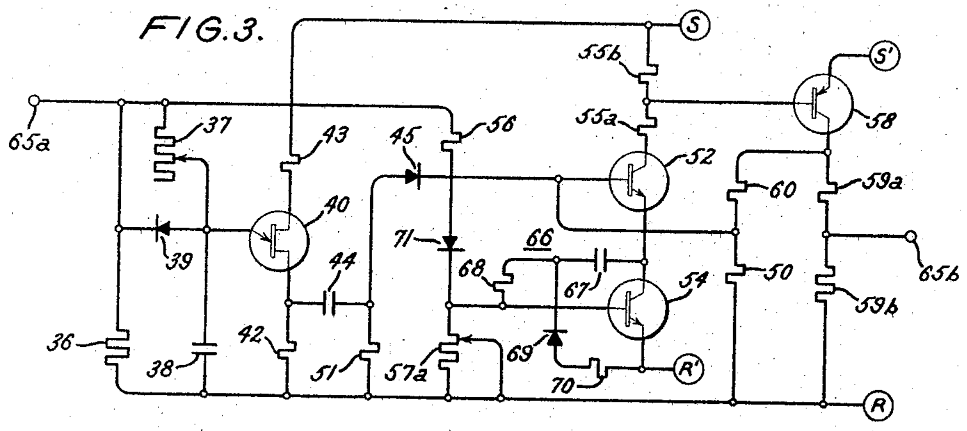
FIG. 3 is a schematic circuit diagram of a preferred embodiment of the time delay pickup and dropout form of my invention.

With reference to FIG. 3, I will next describe the static timing circuit that comprises the second form of my invention. The circuit shown in FIG. 3 is provided with input and output terminals 65*a* and 65*b*, respectively. This circuit, like that of FIG. 2, has a time delay pickup characteristic, but unlike the FIG. 2 arrangement, the circuit shown in FIG. 3 additionally includes a time delay dropout function, and hence it is designed to sustain an output signal at terminal 65*b* for a predetermined length of time after its input terminal 65*a* is deenergized.

It will be observed in FIG. 3 that the illustrated circuit is in large measure a duplicate of the circuit shown in FIG. 2 and described above, with one or two changes and a significant addition to be explained below, and therefore the same reference characters have been used to identify like circuit components. The time delay pickup function of the FIG. 3 circuit is achieved in essentially the same manner as the corresponding function is achieved in the FIG. 2 circuit already described, and the desired pickup delay is obtained by appropriately adjusting the rheostat 37 of the energy storing means 37, 38 of FIG. 3 so that the critical firing level of the level-detecting unijunction transistor 40 is attained when the input terminal 65*a* has been energized continuously for the requisite interval of time.

The time delay dropout function of the FIG. 3 circuit is achieved by employing a transient negative feedback arrangement in conjunction with the transistor 54. This feedback arrangement, which is constructed and operates in accordance with the teachings of Patent 3,067,340—Hodges, comprises a unilaterally conductive energy storing circuit 66 connected in parallel with the collector-base junction of the transistor 54 to sustain forward bias of this transistor, thereby maintaining the transistor in its active state, while accumulating energy under conditions of decreasing conduction in transistor 54. Preferably, as it is illustrated in FIG. 3, the circuit 66 comprises a capacitor 67 in series with a resistor 68. An appropriately poled diode 69 in series with a resistor 70 of relatively small resistance is connected between the negative bias bus R′ and the junction of elements 67, 68 to provide a low-impedance path for quickly dissipating any stored energy of capacitor 67 under conditions of increasing conduction in the transistor 54. In the FIG. 3 circuit an isolating diode 71 is connected between the base electrode of transistor 54 and the current limiting resistor 56 as shown.

The capacitor 67 will be discharged so long as the timing circuit illustrated in FIG. 3 is "on," both of the interconnected transistors 52 and 54 being then conductive (active). Upon removing the energizing signal from the input terminal 65*a*, the emitter-base junction of transistor 54 is allowed to revert to its normal reverse-bias state, whereby conduction by this transistor begins decreasing and its collector to base voltage starts increasing. Consequently the capacitor 67 will then charge through the collector-emitter circuit of transistor 52 and the resistor 68, and the resulting charging current keeps the transistor 54 active until the capacitor 67 has attained a steady state condition. In other words, the capacitor 67 requires a predetermined length of time (in the absence of any input signal at terminal 65*a* during this period) to attain a charge that will enable the emitter-base junction of transistor 54 to be dominated by its normal reverse bias. The resistor 57*a*, which shunts charging current from the emitter-base junction of the transistor 54, determines the turnoff time of the transistor, and its resistance value may be so selected that this "dropout" time is of desired duration. If an input signal is reapplied to terminal 65*a* during this delay period, it drives the transistor 54 into saturation, thereby completely discharging the capacitor 67 and "resetting" the time delay dropout circuitry.

While I have shown and described preferred forms of my invention by way of illustration, various modifications will occur to those skilled in the art. I contemplate therefore by the claims concluding this specification to cover all such modifications as fall within the true spirit and scope of my invention.

What I claim as new and desire to secure by Letters Patent of the United States is:

1. A timing circuit comprising:
(a) means for applying an input signal to the timing circuit;
(b) first normally inactive condition responsive means connected to the input signal applying means and arranged to be activated in response to said input signal being applied to the circuit and to be deactivated in response to the input signal subsequently being removed;
(c) normally deenergized electric energy storing means connected to said input signal applying means and arranged to accumulate energy when said input signal is applied;
(d) level detecting means connected to the energy storing means;
(e) second normally inactive condition responsive means connected to the level detecting means, activation of said second condition responsive means being initiated by the level detecting means whenever the energy accumulation by the energy storing means attains a predetermined level;
(f) means connected to the first and second condition responsive means for deriving a predetermined output control signal only while both condition responsive means are concurrently active; and
(g) feedback means interconnecting said output-control-signal-deriving means and said second condition responsive means for sustaining activation of the second responsive means, once initiated by said level detecting means, so long as said output signal is being derived.

2. The timing circuit of claim 1 in which time delay means is provided for delaying deactivation of the first condition responsive means after the input signal is removed.

3. A timing circuit comprising:
(a) a pair of D.-C. supply voltage terminals;
(b) first and second transistors each having a collector, an emitter, and a base electrode;
(c) a load impedance;
(d) the load impedance and the emitter-collector circuits of both of the transistors being serially interconnected between said terminals, whereby the load impedance can be effectively energized by the supply voltage only while the first and second transistors are concurrently active;
(e) input means adapted to supply a predetermined input signal to the timing circuit;
(f) means including said input means connected to the emitter-base junction of the first transistor for causing forward bias of the first transistor in response to said input signal being applied to the timing circuit and for deactivating the first transistor whenever said input signal is discontinued; and (g) additional means, including said input means, connected to the emitter-base junction of the second transistor for maintaining the second transistor normally inactive and for forward biasing the second transistor in delayed response to the application of said input signal.

4. The timing circuit of claim 3 in which time delay means is provided in association with the first transistor for delaying deactivation of the first transistor when the input signal is discontinued.

5. The timing circuit of claim 4 in which the time delay means comprises an energy storing circuit connected in parallel with the collector-base junction of the first transistor to sustain forward bias of the first transistor under conditions of decreasing conduction therein, with a diode being connected between said energy storing circuit and the emitter of the first transistor to provide a low-impedance path for dissipating stored energy under conditions of increasing conduction in the first transistor, whereby the time delay means is ineffective to delay activation of the first transistor.

6. In a static time delay circuit:
(a) a source of D.-C. supply voltage comprising a reference terminal and a second terminal adapted to be energized by supply voltage of predetermined polarity relative to the reference terminal;
(b) an input terminal adapted to be energized by an input voltage of said predetermined polarity relative to the reference terminal;
(c) energy storing means connected to the input terminal and arranged to accumulate energy when the input terminal is energized;
(d) level detecting means connected to the energy storing means and arranged to operate whenever the energy accumulation by the energy storing means attains a predetermined critical level;
(e) a load impedance;
(f) first and second transistors each having a collector, an emitter, and a base electrode, said load impedance and the emitter-collector circuits of both of said transistors being serially interconnected between said reference terminal and said second terminal with the emitter-collector circuit of the first transistor connected directly to said reference terminal;
(g) means connected to said load impedance and responsive to the concurrent activation of the first and second transistors for deriving with respect to said reference terminal an output voltage of said predetermined polarity;
(h) first circuit means, including said input terminal and the emitter-base junction of the first transistor, for causing forward bias of the first transistor in response to energization of the input terminal;
(i) second circuit means, including said level detecting means and the emitter-base junction of the second transistor, for initiating forward bias of the second transistor in response to operation of the level detecting means; and
(j) feedback means interconnected between the output voltage deriving means and the second circuit means for sustaining forward bias of the second transistor so long as the output voltage is being derived.

References Cited by the Examiner

UNITED STATES PATENTS

| | | | |
|---|---|---|---|
| 2,563,816 | 8/1951 | Butman | 328—66 |
| 2,924,724 | 2/1960 | Booker | 307—88.5 |
| 3,139,539 | 6/1964 | Hewett | 307—88.5 |

DAVID J. GALVIN, *Primary Examiner.*

R. H. EPSTEIN, *Assistant Examiner.*